(12) United States Patent
Loercher et al.

(10) Patent No.: US 11,768,090 B2
(45) Date of Patent: Sep. 26, 2023

(54) FAN

(71) Applicant: ZIEHL-ABEGG SE, Künzelsau (DE)

(72) Inventors: Frieder Loercher, Braunsbach (DE); Alexander Herold, Hardthausen (DE)

(73) Assignee: ZIEHL-ABEGG SE, Künzelsau (DE)

( * ) Notice: Subject to any disclaimer, the term of this patent is extended or adjusted under 35 U.S.C. 154(b) by 80 days.

(21) Appl. No.: 17/599,972

(22) PCT Filed: Mar. 9, 2020

(86) PCT No.: PCT/DE2020/200015
§ 371 (c)(1),
(2) Date: Sep. 29, 2021

(87) PCT Pub. No.: WO2020/207542
PCT Pub. Date: Oct. 15, 2020

(65) Prior Publication Data
US 2022/0397121 A1    Dec. 15, 2022

(30) Foreign Application Priority Data

Apr. 9, 2019 (DE) .......................... 102019205041.7

(51) Int. Cl.
*F04D 27/00* (2006.01)
*F04D 17/16* (2006.01)
(Continued)

(52) U.S. Cl.
CPC .......... *F04D 27/001* (2013.01); *F04D 17/16* (2013.01); *F04D 19/002* (2013.01);
(Continued)

(58) Field of Classification Search
CPC ..... G01F 1/80; G01F 1/82; G01F 1/10; G01F 1/115; G01F 1/12; G01F 1/8454; G01F 1/103; G01F 1/11; G01F 1/90; G01F 1/00; G01F 1/125; F04D 27/001; F04D 27/004; F04D 29/4213; F04D 29/4226; F04D 19/002; F04D 25/0666; F04D 29/281; F04D 29/526; F04D 27/00; F04D 17/16; F24F 2110/30
See application file for complete search history.

(56) References Cited

U.S. PATENT DOCUMENTS

| | | | | |
|---|---|---|---|---|
| 3,142,179 A | * | 7/1964 | Souriau | ...................... G01F 1/12 |
| | | | | 73/861.83 |
| 5,137,428 A | * | 8/1992 | Poll | ........................ F04D 27/008 |
| | | | | 417/42 |
| 2003/0154803 A1 | | 8/2003 | Modera | |

FOREIGN PATENT DOCUMENTS

| | | |
|---|---|---|
| CH | 272599 A | 12/1950 |
| DE | 1244450 B | 7/1967 |

(Continued)

*Primary Examiner* — Peter J Bertheaud
(74) *Attorney, Agent, or Firm* — FisherBroyles, LLP; Jason P. Mueller

(57) ABSTRACT

A fan, in particular axial fan and preferably backward-curved radial fan, having an impeller equipped with blades, an electric motor for rotating the impeller and a device for determining the airflow when the impeller is rotating. The device for determining the airflow includes a volume flow measuring wheel arranged in the air flow, which is arranged upstream of the impeller on the inflow side. The air volume flow is calculated or derived from the rotational speed of the volume flow measuring wheel.

14 Claims, 8 Drawing Sheets

(51) Int. Cl.
- *G01F 1/80* (2006.01)
- *G01F 1/10* (2006.01)
- *G01F 1/84* (2006.01)
- *G01F 1/11* (2006.01)
- *G01F 1/90* (2006.01)
- *G01F 1/12* (2006.01)
- *G01F 1/82* (2006.01)
- *F04D 29/28* (2006.01)
- *F04D 29/42* (2006.01)
- *F04D 19/00* (2006.01)
- *F04D 29/52* (2006.01)
- *F04D 25/06* (2006.01)
- *F24F 110/30* (2018.01)

(52) U.S. Cl.
CPC ......... *F04D 25/0666* (2013.01); *F04D 27/00* (2013.01); *F04D 27/004* (2013.01); *F04D 29/281* (2013.01); *F04D 29/4213* (2013.01); *F04D 29/4226* (2013.01); *F04D 29/526* (2013.01); *G01F 1/10* (2013.01); *G01F 1/103* (2013.01); *G01F 1/11* (2013.01); *G01F 1/12* (2013.01); *G01F 1/125* (2013.01); *G01F 1/80* (2013.01); *G01F 1/82* (2013.01); *G01F 1/8454* (2013.01); *G01F 1/90* (2013.01); *F24F 2110/30* (2018.01)

(56) References Cited

FOREIGN PATENT DOCUMENTS

| | | |
|---|---|---|
| DE | 102005059336 A1 | 6/2007 |
| DE | 102015103594 B3 | 3/2016 |
| EP | 0041667 A2 | 12/1981 |

\* cited by examiner

FAN

CROSS-REFERENCE TO RELATED APPLICATIONS

This application is a national stage entry application under 35 U.S.C. 371 of PCT Patent Application No. PCT/DE2020/200015, filed 9 Mar. 2020, which claims priority to German Patent Application No. 10 2019 204 041.7, filed 9 Apr. 2019, the entire contents of each of which are incorporated herein by reference.

FIELD

The present disclosure relates to a fan, in particular an axial fan and preferably a backward-curved centrifugal fan. For the basic design of a fan, reference is made only by way of example to DE 10 2017 209 291 A1.

BACKGROUND

An axial fan has an impeller equipped with blades, which is driven by an electric motor. Especially for the purpose of controlling such a fan, there is a need to determine the volume flow when the fan is in operation. Up to now, this has been done exclusively based on electrical data (in particular of the drawn flow) of the electric motor. However, due to the ambiguity in the torque characteristic, the volume flow cannot be calculated unambiguously. In addition, known from practice is the volume flow calculation with the aid of differential pressure measurements. This is time-consuming and it involves inaccuracies too great for many applications.

Particularly in the case of forward-curved radial fans, the volume flow is often determined using the shaft torque. Otherwise, the volume flow determination occurs via differential pressure measurement or by means of an impeller anemometer, often on the downstream side of the fan. In this regard, reference is made to WO 2018/036802 A1. The measurements or determinations of the air volume flow known from practice are on the one hand time-consuming and on the other hand inaccurate. They are therefore only suitable to a limited extent as a basis for fan control (constant volume flow control).

SUMMARY

It is therefore the object of the present disclosure to design and further develop a fan of the generic type in such a way that it is possible to determine the volume flow when the fan is in operation by simple technical means. Based on such a volume flow determination, it should be possible to create a simple control mechanism for the fan. In addition, the fan according to the disclosure is to be distinguished from competitive products.

The preceding object is achieved by the features of claim 1. A device is assigned to the fan for determining the airflow when the impeller is rotating. This device comprises a volume flow measuring wheel arranged in the airflow, which is arranged upstream of the impeller on the inflow side. The air volume flow is calculated or derived from the rotational speed of the volume flow measuring wheel. This is based on the knowledge that the air volume flow of the fan can be derived with sufficient accuracy from the rotational speed of such a volume flow measuring wheel. The structural measure required for this purpose, namely the provision of a volume flow measuring wheel together with further hardware and software if necessary, is conceivably simple and can be effortlessly integrated into a conventional fan, both in terms of the volume flow measuring wheel and in terms of additional components of the device, which will be discussed later.

The volume flow measuring wheel may be arranged approximately coaxially with the impeller axis, which simplifies the mounting of the volume flow measuring wheel. The same applies to the arrangement of the volume flow measuring wheel close to the motor. Both measures not only allow simple mounting of the volume flow measuring wheel, but also ensure that the airflow through the volume flow measuring wheel is at most only slightly impeded. In addition, it is conceivable to make positive use of the specific design of the volume flow measuring wheel to positively influence the flow, on the one hand with regard to noise development and on the other hand, with regard to performance or efficiency, especially since the volume flow measuring wheel is arranged on the inflow side.

With regard to the mounting of the volume flow measuring wheel, it is conceivable that this is mounted on a structure arranged upstream of the impeller on the inflow side, in particular upstream of an inlet nozzle. This structure may be a functional component of the fan, for example a guard grille or an inflow grille. In this way, existing functional components of the fan can be used without further design effort.

The volume flow measuring wheel can be a rotating wheel. Accordingly, this is rotatably mounted on a shaft, preferably on a possibly extended shaft of the motor.

The volume flow measuring wheel extends over the flow cross section in the inflow area of the fan, wherein the outer radius of the volume flow measuring wheel in an embodiment is less than 75% of the maximum radius of the associated flow cross section.

It has already been explained that it depends on the signal of the volume flow measuring wheel from which measured values are derived. The signal of the volume flow measuring wheel can be generated by means of electrical and/or magnetic and/or acoustic and/or vibration sensor technology/sensors. Thus, inductive measurements, measurements with a Hall sensor, optical measurements, acoustic measurements or also vibration measurements can be used. Accordingly, magnetic and/or light-reflecting and/or electrical components are arranged on/in the volume flow measuring wheel and/or on/in the rotor of the motor and/or on/in an inlet nozzle of the fan. With the aid of the sensor technology additionally provided here, interactions between the components of the fan, in particular the motor and the sensor technology, can be utilized.

Physical variables or composite quantities can be determined for determining the air volume flow. For example, the interaction of the rotor magnets with an electrical element on the volume flow measuring wheel can be used. Optical access between the stator and the volume flow measuring wheel through openings on the rotor can also be used. Optical access between the stator of the motor and the volume flow measuring wheel can also be used. In addition, electrical signals can be transmitted via electrically conductive components, for example via the shaft of the motor/volume flow measuring wheel. The acoustic signature of the volume flow measuring wheel can be measured and used in the same way. In particular, acoustic phenomena/signatures resulting from interactions with the impeller or its blades can also be used.

Magnetic and/or light-reflecting and/or electrical components, which are part of the device for determining the air flow, can be arranged on or in the volume flow measuring wheel, on or in the rotor of the motor and/or on or in an inlet nozzle of the fan and/or on a structure arranged upstream of the impeller in the inflow side. In accordance with the preceding embodiment, interactions between the components of the fan and the elements mentioned above can be used to obtain physical quantities or composite quantities to determine the airflow.

The air volume flow can be determined without the influence of the rotational speed of the impeller or taking into account a correction factor, which at least approximately takes into account the rotational speed of the impeller. It is also possible to determine the rotational speed of the volume flow measuring wheel directly with respect to a reference system from the signals of the volume flow measuring wheel. Alternatively, the rotational speed of the volume flow measuring wheel relative to the rotational speed of the impeller of the fan can be determined from the signals of the volume flow measuring wheel.

The rotational speed of the volume flow measuring wheel can be determined from the signals of the volume flow measuring wheel as the sum of the rotational speed of the impeller and the relative speed between the impeller and the volume flow measuring wheel. A reliable determination of the air volume flow may be required.

The hardware components of the device for determining the airflow may be assigned to the motor or integrated in the motor independently of the impeller. Consequently, the device for determining the air volume flow does not require any additional installation space. The volume flow measuring wheel uses the space that is already available on the inlet side and can be used positively to promote flow and reduce noise.

The hardware components of the device for determining the airflow may be assigned, in a further embodiment, independently of the impeller, essentially arranged or integrated into a structure upstream of the impeller on the inflow side. Consequently, the device for determining the air volume flow does not require any additional installation space. The volume flow measuring wheel uses the space that is already available on the inlet side and can be used positively to promote flow and reduce noise. If required, the volume flow measuring device integrated in the structure on the inflow side can be used modularly for fans, regardless of their impeller. Different calibration values can be stored and used for determining the volume flow as a function of the rotational speed of the volume flow measuring wheel and, if necessary, of the impeller for different impellers, inlet nozzles, downstream deflectors or installation situations.

The signals and the resulting measurement data of the volume flow measuring wheel, in particular the airflow determined from the signals and measurement data, may be fed to a control of the fan. This control can be used in particular to maintain a predetermined or predeterminable volume flow. This applies in particular to changing operating conditions. Thus, a control mechanism is created by simple means.

There are now various possibilities for designing and further developing the teachings of the present disclosure. For this purpose, reference should be made on the one hand to the claims subordinate to claim 1 and on the other hand to the following explanation of embodiments of a fan according to the disclosure with reference to the drawings.

BRIEF DESCRIPTION OF THE SEVERAL VIEWS OF THE DRAWINGS

In connection with the explanation of the embodiments of the disclosure with reference to the drawings, multiple embodiments of the teaching are also explained. The drawings show FIG. 1 seen from the inflow side in axial plan view, an example of a fan with a volume flow measuring wheel according to the disclosure, which extends almost over the entire radial region of the flow cross section, FIG. 2 seen from the inflow side in axial plan view, an example of a fan with a volume flow measuring wheel according to the disclosure, which extends only over a radially inner partial region of the flow cross section, FIG. 3 seen from the side and in section along a plane through the fan axis, the fan with a volume flow measuring wheel according to FIG. 2, FIG. 4 seen from the side and in section along a plane through the fan axis, the fan with a volume flow measuring wheel according to FIG. 1, FIG. 5 seen obliquely from the inflow side in a perspective view, a further embodiment of a volume flow measuring wheel, which has a strongly curved course of its blades or their inflow edges, FIG. 6 obliquely seen from the downstream side of an inflow grille in a perspective view, the volume flow measuring wheel according to FIG. 5, which is attached to an inflow grille, FIG. 7 obliquely seen from the inflow side in a perspective view, a fan with an inflow grille according to FIG. 6, and FIG. 8 in a perspective view and in section on a plane through the axis of rotation of the impeller, the fan according to FIG. 7, wherein the volume flow measuring wheel and its mounting on the inflow grille are clearly visible.

DETAILED DESCRIPTION OF THE DISCLOSURE

Figure 1:
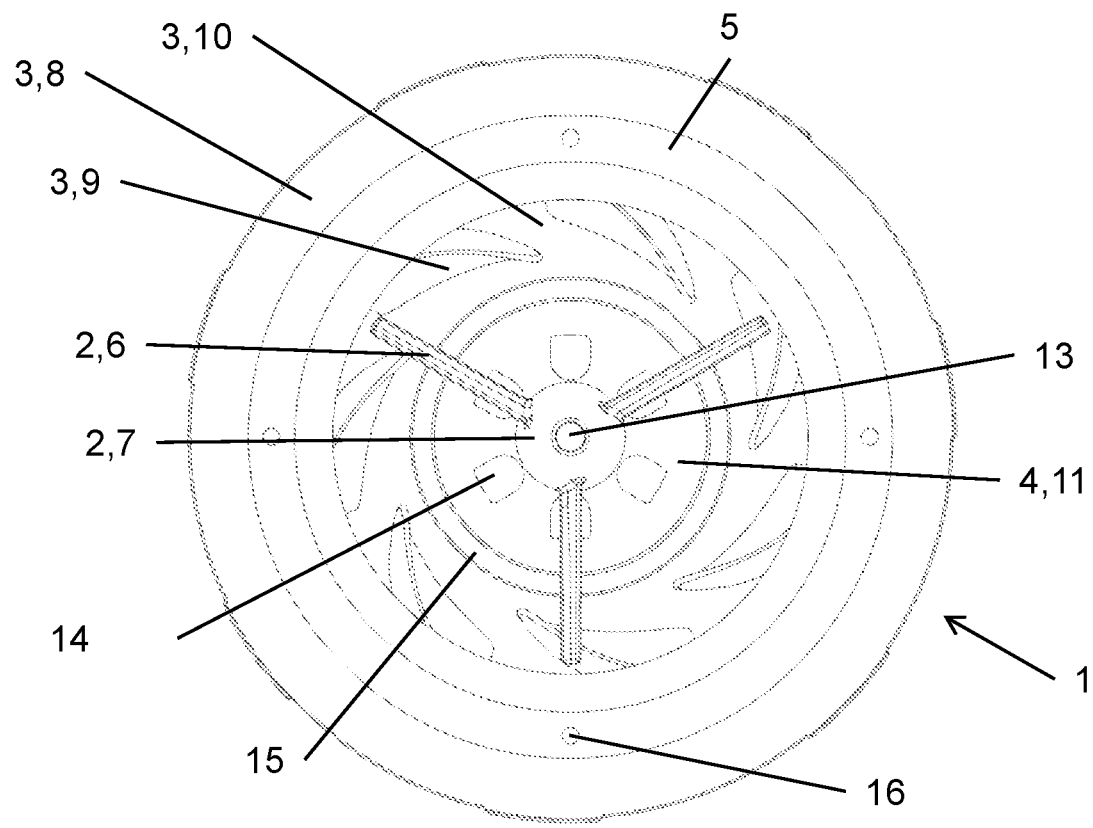

FIG. 1 shows an axial plan view of an exemplary embodiment of a fan 1 with a volume flow measuring wheel 2 viewed from the inflow side. The volume flow measuring wheel 2 extends over almost the entire radial region of the flow cross section of the inlet nozzle 5, approximately at its narrowest point. The volume flow measuring wheel 2 essentially consists of a hub 7 and of the blades 6 attached to it. In the embodiment example, there are 3 blades 6 to minimize the disturbance that the volume flow measuring wheel 2 introduces into the inflow to the fan impeller 3 or its blades 9. An embodiment with 2 to 13 blades 6 is conceivable.

Figure 3:
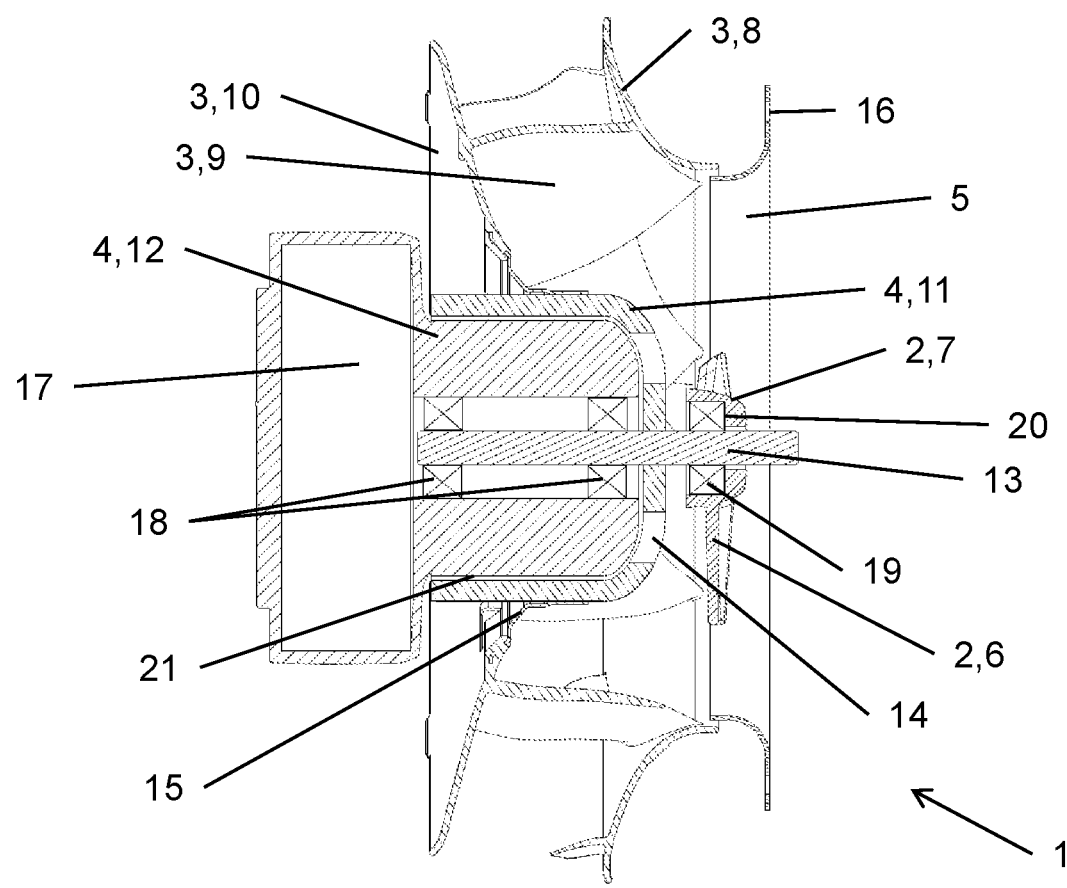

The volume flow measuring wheel 2 is rotatably mounted on a shaft 13 by means of a bearing 19 (see FIG. 3). In the embodiment example, the shaft 13 rotates with the rotational speed of the rotor 11 of the motor 4 or of the impeller 3 of the fan 1. It is an extended shaft of the motor 4. Due to the bearing arrangement with the lowest frictional torque (ball bearing, plain bearing or similar), the volume flow measuring wheel 2 can rotate freely and independently of the shaft 13 and its rotational movement. The rotational speed of the volume flow measuring wheel 2 is a well-suited indicator of the air volume flow which enters the fan impeller 3 through the inlet nozzle 5, i.e. the air volume flow which is delivered by the fan 1. To determine the volume flow, the rotational speed of the volume flow measuring wheel 2 is determined.

Figure 2:
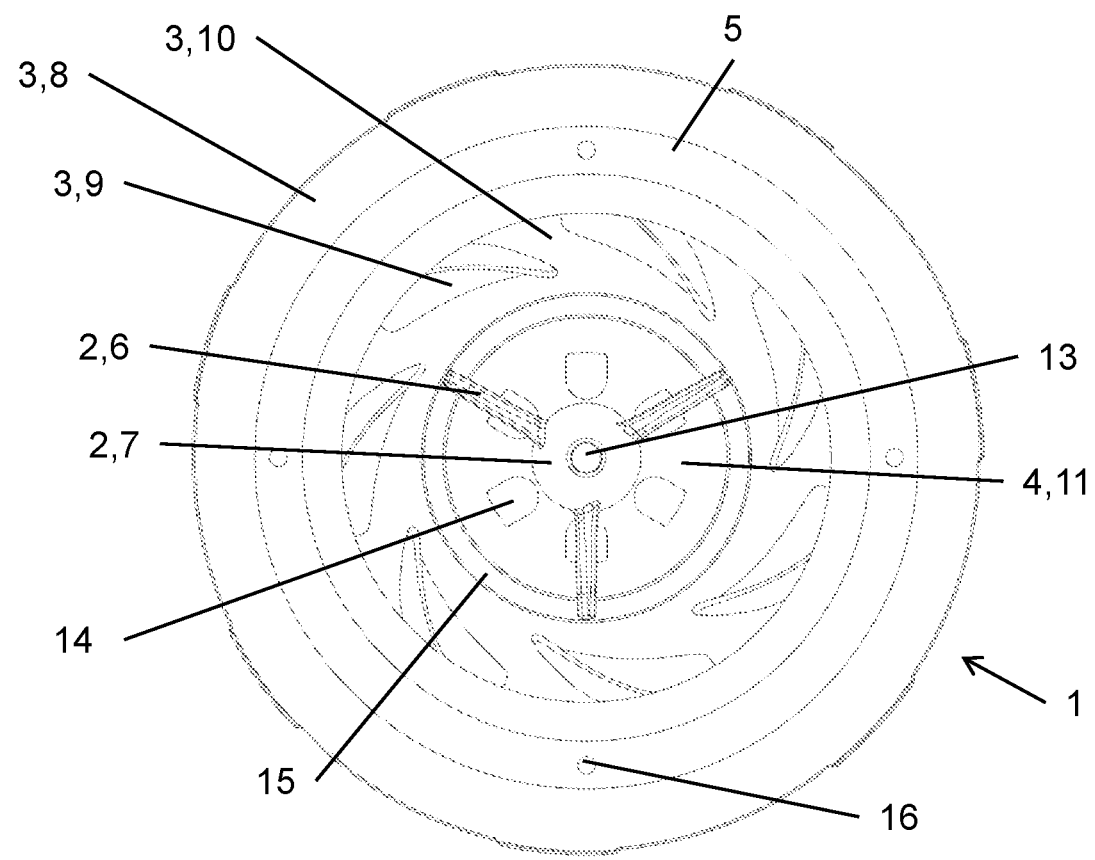

FIG. 2 shows an axial plan view of a further exemplary embodiment of a fan 1 with a volume flow measuring wheel 2 viewed from the inflow side. In this exemplary embodiment, the volume flow measuring wheel 2 extends only over a radially inner partial region of the flow cross section of the inlet nozzle 5. As a result, the accuracy of the air volume flow determination may be slightly reduced compared to the embodiment example according to FIG. 1. However, the volume flow measuring wheel 2 is more compact, less expensive to manufacture and introduces less disturbance to the air flowing in through an inlet nozzle 5, which may have advantages in terms of noise generated and efficiency.

The blades 6 of the volume flow measuring wheel 2 are formed in a special manner so that, as a result of the air volume flow, a suitable rotational speed of the volume flow measuring wheel 2 approximately proportional to the flow rate is established. The proportionality constant of this ratio can be controlled by the design of the blades 6. In an embodiment, the blades 6 have a cross sectional profile similar to that of an airfoil on an aircraft. The trailing edge of the blades 6 is thin, preferably <1 mm. The blades 6 are twisted, that is, the blade angle varies over the radius, that is, the distance from the fan axis. The leading edge has a rather rounded shape, without kinks and edges. At the radially outer end, the blades 6 are freely tapered. In other embodiments, they could be connected to each other by a ring, which may be advantageous for the stability of the volume flow measuring wheel 2, but it means an additional flow resistance for the incoming air. In the embodiment example, the blades 6 have substantially a course along a radial beam as seen from the fan axis, which achieves that the bending stress and deformation in operation remains low due to the rotational speeds. The radially outer end of the blades of the volumetric impeller in other embodiments may also be shaped in a special manner, for example similar to that of a wingtip or tapered. Blades of a volume flow measuring wheel can also have a loop-like design or be connected to each other in pairs in a radially outer region.

FIG. 3 shows from the side and in section along a plane through the fan axis, the fan 1 with a volume flow measuring wheel according to FIG. 2. In operation, the fan impeller 3, which essentially consists of a hub ring 10, a cover ring 8 and blades 9 extending there between, is driven by a motor 4. The fan impeller 3 is attached to the rotor 11 of the motor 4 by means of an attachment device 15. In the embodiment example, the motor 4 is an external rotor motor, constructed from the rotor 11, which is arranged radially substantially outside the stator 12. An air gap 21 is formed between the rotor 11 and the stator 12. In order to support the rotor 11 with respect to the stator 12, a shaft 13 is formed in the area of the fan axis, which is fixedly connected to the rotor 11, and which extends partly inside the stator 12. It is rotationally connected to the stator 12 via the bearings 18. The stator 12 has, among other things, a receiving space 17 for electronic components. Permanent magnets, which are not explicitly shown, are present in the rotor 11 in the radially outer region.

In the embodiment example, the shaft 13 extends on the side remote from the stator 12 beyond the rotor 11 into the region of the inlet nozzle 5. On the shaft 13 in this region, connected by means of a bearing 19, the volume flow measuring wheel 2 is mounted so as to rotate freely with respect to the shaft 13. This allows the volume flow measuring wheel 2 to assume a rotational speed independent of the rotational speed of the rotor 11 of the motor 4. The rotational speed of the volume flow measuring wheel 2 is defined by the air volume flow that enters the impeller 3 from the right through the inlet nozzle 5 and is delivered by the fan as a result of its rotational speed. It is measured by a sensor system and used to determine the air volume flow. It can be seen that in the embodiment example the volume flow measuring wheel 2 extends only over a radially inner part of the flow area of the inlet nozzle 5.

Figure 4:
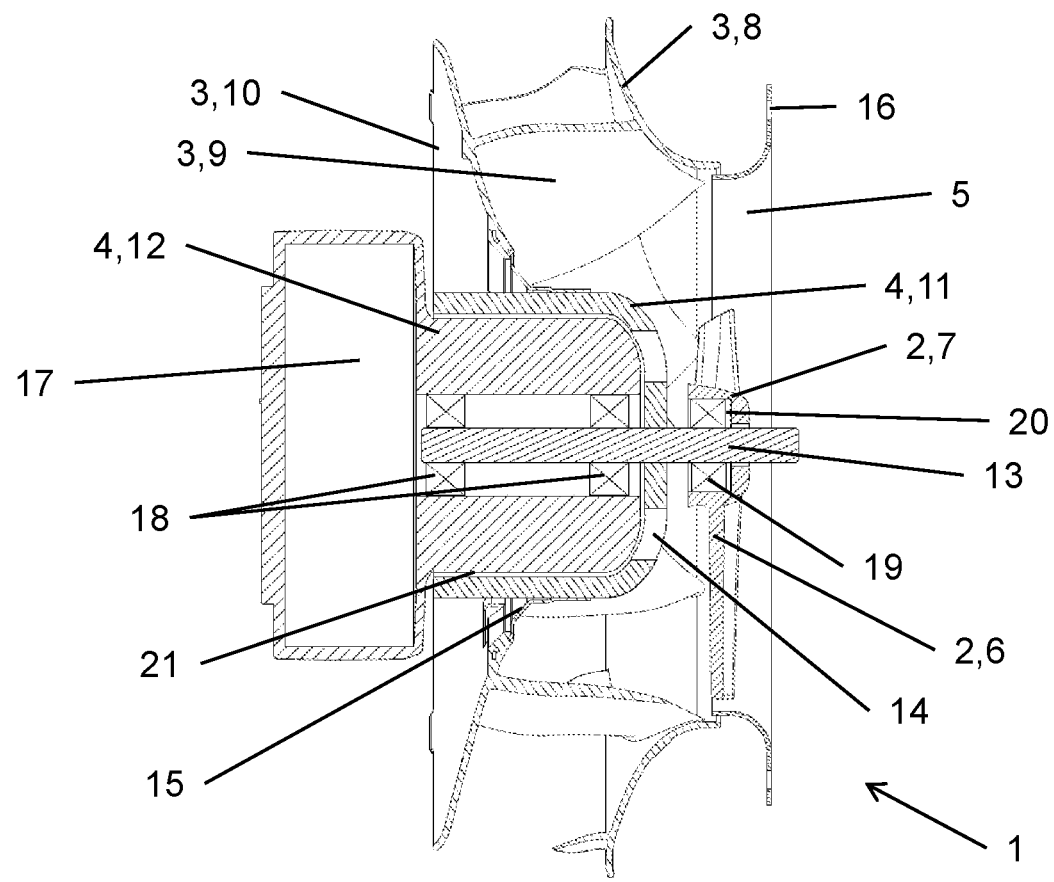

FIG. 4 shows from the side and in section along a plane through the fan axis, the fan 1 with a volume flow measuring wheel 2 according to FIG. 1. Compared to the embodiment according to FIG. 3, it can be seen that in this embodiment example the volume flow measuring wheel 2 with its blades 6 extends radially almost over the entire flow area of the inlet nozzle 5, which leads to an even more precise detection of the air volume flow. This applies in particular when disturbed, asymmetrical inflow conditions are present. However, such a volume flow measuring wheel 2 is also larger, more complex to manufacture and leads to greater disturbances superimposed on the inflow, which can lead to increased acoustics and reduced efficiencies.

As in the embodiment example according to FIGS. 2 and 3, the volume flow measuring wheel 2 has a relative rotational speed to the rotor 11 of the motor 4 in operation. To determine the rotational speed of the volume flow measuring wheel 2, either the relative speed to the rotor 11 can be determined and added to the rotational speed of the rotor 11, or the rotational speed of the volume flow measuring wheel 2 can be determined directly with respect to the stationary system, for example with respect to the stator 12. Optical accessibility between the stator 12 and the blades 6 of the volume flow measuring wheel 2 can be realized, for example, via openings 14 on the rotor 11. In the embodiment example, the openings 14 have the additional function of allowing a cooling airflow through the air gap 21 towards the inflow area of the fan impeller 3.

For the purpose of rotational speed measurement, provisions may be present on one or more blades 6 of the volume flow measuring wheel 2, for example reflectors, permanent magnets or electrical components such as coils or Hall sensors. An alternating magnetic field occurring on the volume flow measuring wheel 2 as a result of the relative speed to the rotor 11 provided with permanent magnets can be utilized. Sensors or signal transmitters such as permanent magnets, acoustic signal transmitters or light emitting diodes can also be attached to stationary parts (stator 12 or inlet nozzle 5). The sensor signals can be processed and further utilized in an electronic system, which may be installed in the receiving area 17.

Figure 5:
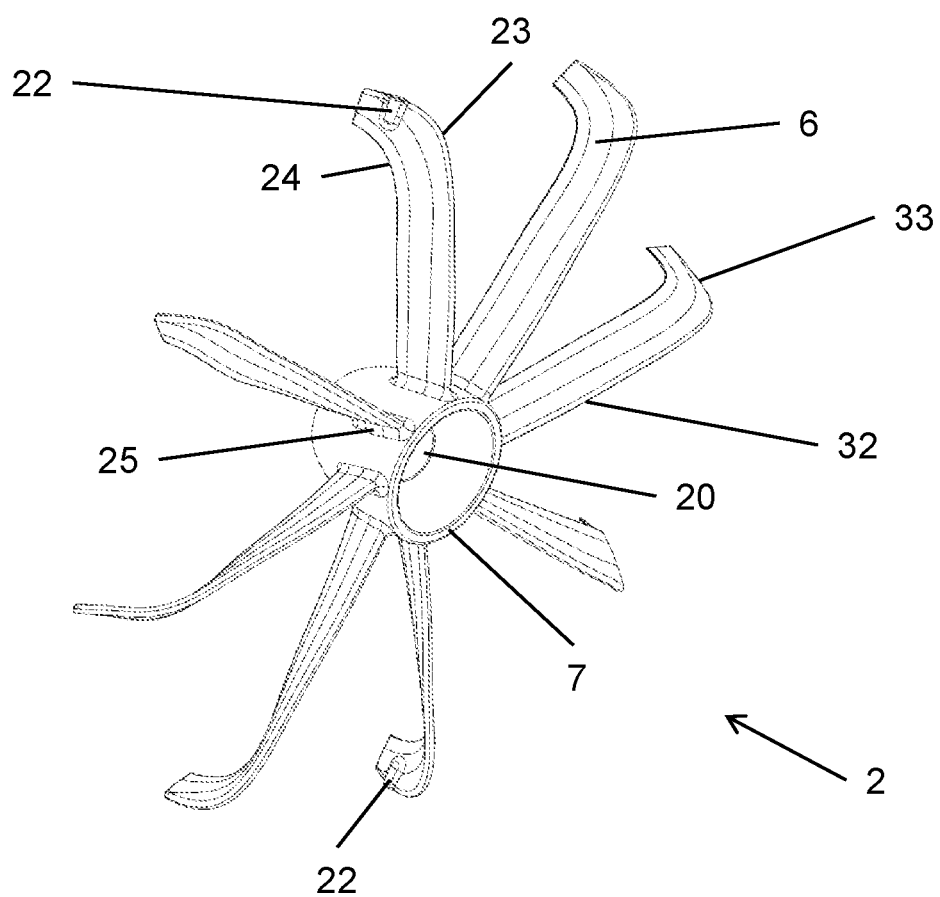

FIG. 5 shows a perspective view, seen obliquely from the inflow side, of a further embodiment of a volume flow measuring wheel 2. It has a hub 7 with a receiving area 20 for bearings, and blades 6 which are connected to the hub 7 at a transition 25. The transition 25 is rounded to have a good strength. The blades 6 have inflow edges 23, which are located at the front of the blades 6 as seen in the direction of flow, and outflow edges 24, which are located at the rear of the blades 6 as seen in the direction of flow. The blades 6 in the embodiment example as well as their inflow edges 23 and their outflow edges 24 are strongly curved. This is due to the fact that an inner part 32 of the inflow edges 23 is optimized and suitable for a rather axis-parallel inflow and an outer part 33 is optimized or suitable for a rather radial inflow, flowing approximately towards the axis. In particular, in a transition area between the inner part 32 and the outer part 33, the inflow edge 23 or the wing 6 is strongly curved.

On two opposite sides of the total of eight blades 6 in the embodiment example, receiving areas 22 are formed for one magnet each. The magnets are used for speed detection in interaction with a sensor, for example a Hall sensor, located opposite the magnets during operation. The magnets can be cast in, glued in, pressed in or otherwise attached to one or more blades 6. Overall, it may be advantageous to have at least two magnets evenly distributed around the circumference to avoid excessive imbalance of the volume flow measuring wheel 2.

Figure 6:
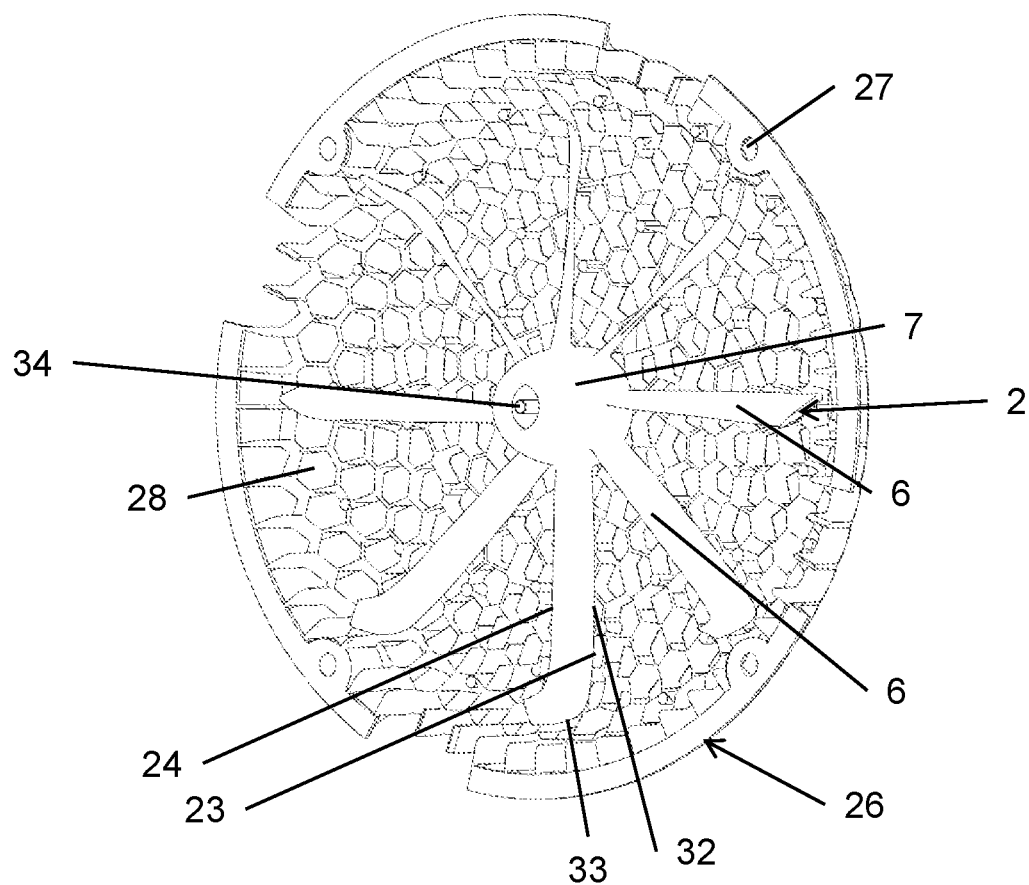

FIG. 6 shows a perspective view of the volume flow measuring wheel 2 as shown in FIG. 5, viewed obliquely from the downstream side, with an inflow grille 26 on which it is mounted and supported. An inflow grille 26 is mounted in front of an inlet nozzle 5 of a fan 1 according to the illustration in FIG. 8. Instead of an inflow grille 26, another type of support structure for a volume flow measuring wheel 2 can also be used, as long as it does not significantly impair the inflow to the inlet nozzle 5, for example a contact protection grille or a support structure. The inflow grille 26 according to the shown embodiment example is attached to the attachment devices 27 on the fan 1 or a nozzle 5 or a nozzle plate 29 (see FIG. 8). The pumped medium flows through the inflow grille 26 through flow openings 28, which are designed in such a way that the losses during the flow are low. The inflow grille 26 can even increase the efficiency of the fan and reduce noise emission by equalizing the inflow ratios.

The volume flow measuring wheel 2 is rotatably mounted on the inflow grille 26 in the area of the fan axis, which approximately coincides with the axis of the inflow grille 26, inside the inflow grille 26, that is in the direction of flow downstream of the inflow grille 26. An axis 34, which is connected to the inflow grille 26 in a rotationally fixed manner and which is integrated or fastened to the inflow grille 26, serves to support the volume flow measuring wheel 2. As a result of the air velocity when the fan is in operation, the volume flow measuring wheel 2 rotates relative to the inflow grille 26, and by measuring its rotational speed, the delivery volume flow during operation can be determined with good accuracy.

The uniformity of the inflow through the inflow grille 26 also has a beneficial effect on the accuracy and stability over time of the volume flow measurement, particularly in the case of asymmetric or turbulent inflows. The inflow edges 23 of the blades 6 of the volume flow measuring wheel 2 face the inflow grille 26 and follow approximately the inner contour of the inflow grille 26 at a distance. In order to achieve an accurate volume flow measurement, the volume flow measuring wheel 2 covers a large part of the flowed-through area with its inflow edges 23, taking into account its rotation about the axis 34, for example at least 90%. The inflow grille 26 has a more radial flow in a radially outer area and an axial flow in a radially inner area. The volume flow measuring wheel 2 is well adapted to this flow pattern with its inner part 32 and outer part 33, as already described for FIG. 5.

Figure 7:
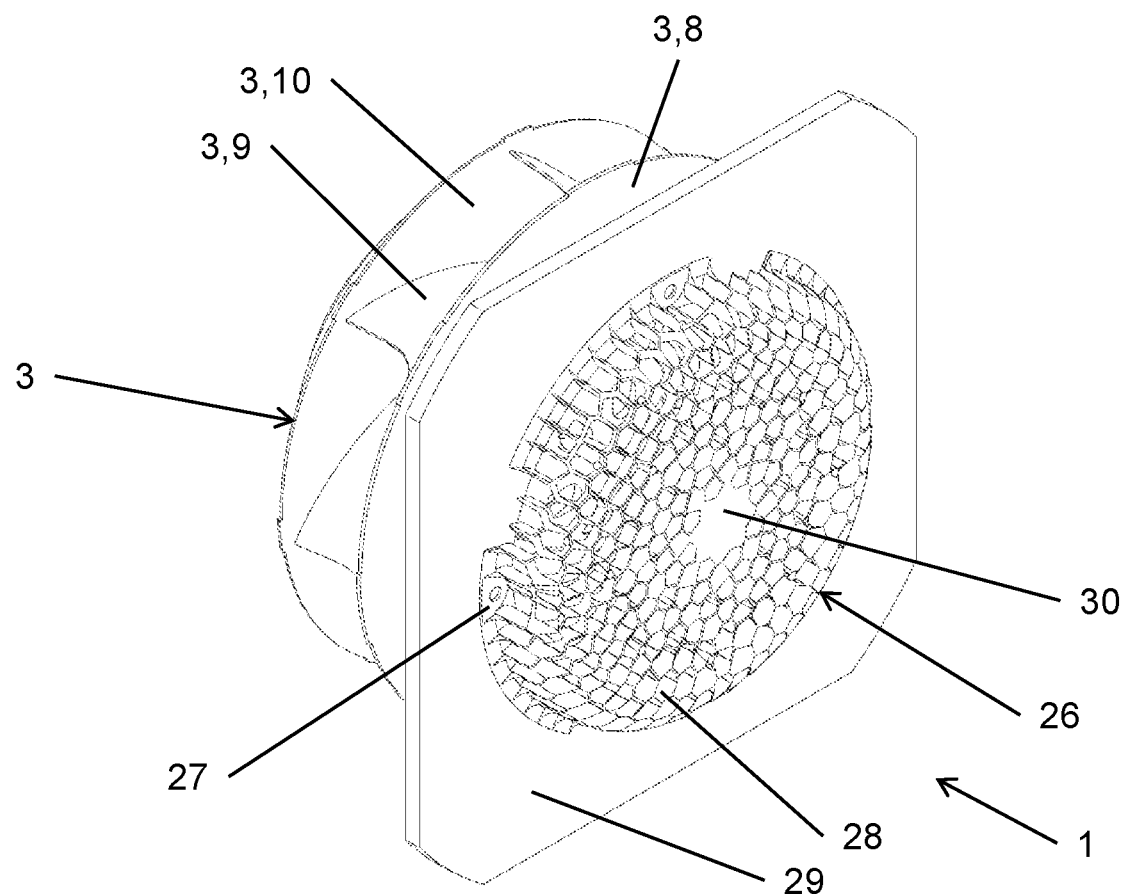

FIG. 7 shows a perspective view of the fan 1 obliquely seen from the inflow side with an inflow grille 26 as shown in FIG. 6. When the fan 1 is in operation, the impeller 3 with a hub ring 10, a cover ring 8 and blades 9 extending between them rotates approximately clockwise around its axis.

As a result of the rotation, the pumped medium is drawn in through the flow openings 28 of the inflow grille 26.

The inflow grille 26 is attached to attachment devices 27 on the fan 1, in this case on the nozzle plate 29, for example by screws not shown. An inlet nozzle 5 is integrated or attached to the nozzle plate 29 (see FIG. 8), which is not visible in FIG. 7 due to the inflow grille 26. After flowing through the inflow grille 26, the pumped medium passes through this inlet nozzle 5 into the impeller 3, in which it is conveyed radially outward and from which it emerges at the radially outward openings. The inflow grille 26 has a closed central area 30 which is there well suited for mounting a volume flow measuring wheel, namely on the inside of the inflow grille 26 which is not visible here. The entire conveying medium volume flow passes through the inflow grille 26. In a radially outer area, rather facing the nozzle plate 26, the inlet velocities are rather radially oriented. In an area more proximate to the axis or central area, the inlet velocities are more axially oriented.

Figure 8:
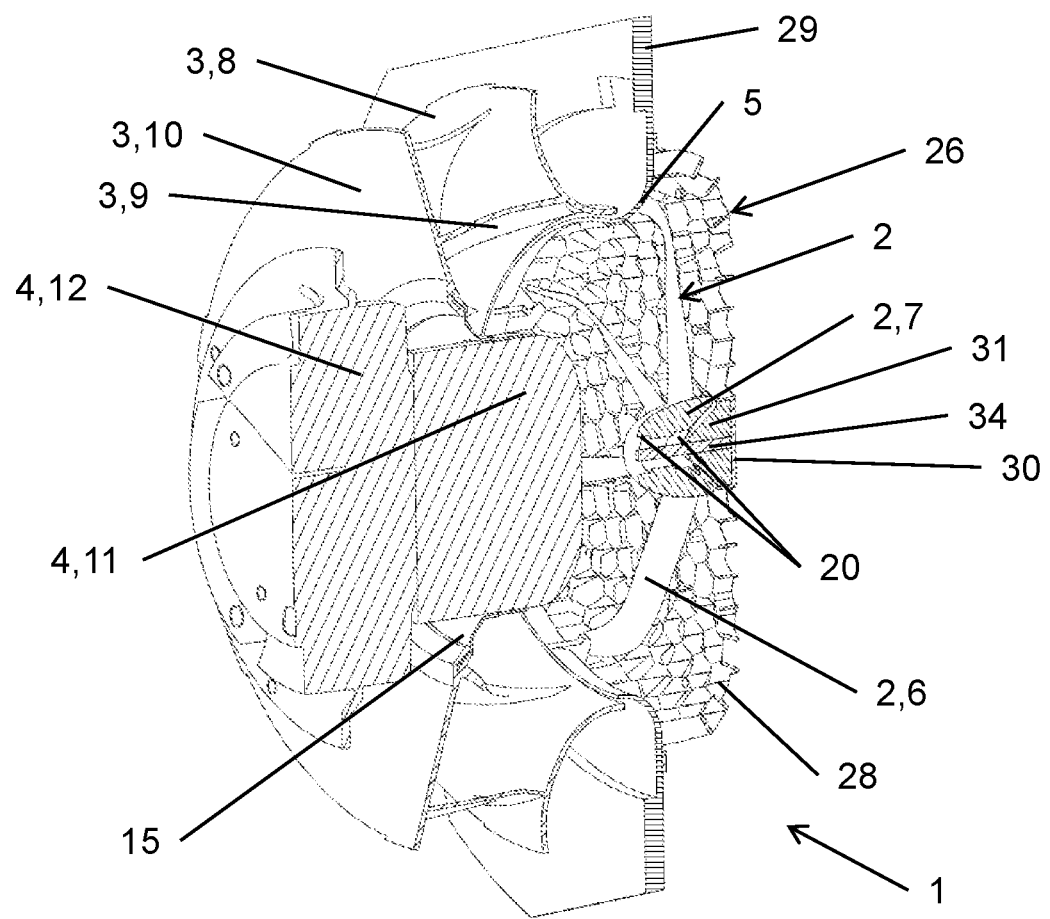

FIG. 8 shows the fan 1 according to FIG. 7 in a perspective view and in section along a plane through the axis of rotation of the impeller 3. The illustration clearly shows the volume flow measuring wheel 2 and its mounting on the inflow grille 26. An axis 34 for mounting the volume flow measuring wheel 2 is fixed to the central area 30 of the inflow grille 26 via a receiving area 31 and is approximately coaxial with the axis of the impeller 3. The receiving area 31 can be integrated in one piece into the inflow grille 26 or can be for example clipped or glued as a separate part to the inflow grille 26. The axis 34 may be cast, glued in, pressed in, or the like, in the receiving area 31. The volume flow measuring wheel 2 is mounted on the axis 34 by means of bearings. In the embodiment example, two bearings not shown in the figure are provided. The bearings are inserted on the volume flow measuring wheel 2 at receivers 20 provided for this purpose within the hub 7. The volume flow measuring wheel 2 can thus rotate freely with respect to the inflow grille 26 and independently of the rotor 11 of the motor 4, which drives the impeller 3 of the fan 1.

The impeller 3 of the fan 1 is attached to the rotor 11 of the motor 4 by means of an attachment device 15, which in this case is a sheet metal disk cast into the impeller 3 and pressed onto the rotor 11. In comparison with the embodiments of FIGS. 1 to 4, the volume flow measuring wheel 2 is here mounted on an axis 34 which is also stationary when the fan is in operation. This is advantageous in particular for low bearing friction, since the volume flow measuring wheel 2 tends to rotate much more slowly over wide operating ranges than the rotor 11 or the impeller 3 on which the volume flow measuring wheel 2 is mounted according to FIGS. 1 to 4. Another advantage of the embodiment according to FIGS. 7 to 8 is that the volume flow measuring wheel is further away from the impeller 3 with its blades 9 and thus the interaction between impeller 3 or blades 9 and volume flow measuring wheel 2 in the form of a speed or operating point dependence is lower. This enables a more accurate determination of the conveying medium volume flow even without including the impeller speed.

For example, the rotational speed of the volume flow measuring wheel in operation can be determined as previously described. In a method, one or more magnets are attached to or integrated in the volume flow measuring wheel 2, or the volume flow measuring wheel 2 is magnetized in some form (see FIG. 5). Opposite the rotation path of the magnets, a sensor, for example a Hall sensor, may be attached to a stationary part, which interacts with the magnets to determine the rotational speed of the volume flow measuring wheel 2. Such a sensor can, for example, be integrated into the inflow grille 26 or attached to the inflow grille 26 or on the inside of the nozzle plate 29 or the inlet nozzle 5. Alternatively, it can also be fastened to the inlet grille 26 in the area of the attachment devices 27 (see FIG. 7) with a suitable support part.

For the sake of completeness, it should be mentioned that not all components of the fan 1 are shown. In particular, a motor support that attaches the stator 11 of the motor 4 to the nozzle plate 29, for example, is not shown for clarity. The fan 1 may comprise further components not shown.

With regard to further embodiments of the teaching according to the disclosure, reference is made to the general part of the description and to the appended claims in order to avoid repetition.

Finally, it should be expressly noted that the above described embodiments of the teaching according to the disclosure merely serve to discuss the claimed teaching, but do not limit it to the embodiments.

LIST OF REFERENCE NUMBERS

1 Fan
2 Volume flow measuring wheel
3 Fan impeller
4 Motor
5 Inlet nozzle
6 Blades of a volume flow measuring wheel
7 Hub of a volume flow measuring wheel
8 Cover ring of an impeller
9 Blades of an impeller
10 Hub ring of an impeller
11 Rotor of the motor
12 Stator of a motor
13 Shaft for supporting a volume flow measuring wheel
14 Opening on the inflow side in the rotor
15 Attachment device of the fan impeller on the rotor
16 Device for attaching an inlet nozzle
17 Receiving space for electronic components in the stator of the motor
18 Support of the rotor
19 Support of the volume flow measuring wheel on the shaft
20 Receiver in the volume flow measuring wheel for the support
21 Air gap between rotor and stator
22 Receiving area for magnet
23 Inflow edge of a blade of a volume flow measuring wheel
24 Outflow edge of a blade of a volume flow measuring wheel
25 Transition blade to hub at volume flow measuring wheel
26 Inlet grille, inflow grille
27 Attachment device for an inlet grille
28 Flow openings on an inlet grille
29 Nozzle plate
30 Central area of an inlet grille
31 Receiving area for axis in an inlet grille
32 Inner part of the inflow edges
33 Outer part of the inflow edges
34 Axis to support the volume flow measuring wheel

The invention claimed is:

1. A fan, having an impeller equipped with blades, a drive for rotating the impeller and a device for determining airflow when the impeller is rotating, wherein the device comprises:
a volume flow measuring wheel arranged in the air flow, which is arranged upstream of the impeller on an inflow side:
wherein an air volume flow is calculated or derived from the rotational speed of the volume flow measuring wheel:
wherein the volume flow measuring wheel is mounted on a structure arranged upstream of the impeller on an inflow side upstream of an inlet nozzle, wherein the structure is an inflow grille.

2. The fan according to claim 1, wherein the volume flow measuring wheel is arranged approximately coaxial to the impeller axis.

3. The fan according to claim 1, wherein the volume flow measuring wheel is arranged close to the drive.

4. The fan according to claim 1, wherein the volume flow measuring wheel is rotatably mounted on an axis or shaft of the drive.

5. The fan according to claim 1, wherein the volume flow measuring wheel extends over a radially inner partial area of a flow cross section of a fan inlet, wherein an outer radius of the volume flow measuring wheel advantageously is less than 75% of a maximum radius of the flow cross section.

6. The fan according to claim 1, wherein a signal of the volume flow measuring wheel is generated by means of an electrical, magnetic, acoustic, or vibration device.

7. The fan according to claim 6, wherein magnetic, light-reflecting, or electrical components are arranged on or in at least one of: the volume flow measuring wheel; a rotor of the drive; and the inlet nozzle for determining the air volume flow.

8. The fan according to claim 1, wherein the air volume flow is determined without the influence of a rotational speed of the impeller or taking into account a correction factor which takes into account the rotational speed of the impeller.

9. The fan according to claim 1, wherein the rotational speed of the volume flow measuring wheel is determined directly with respect to a stationary reference system from the signals of the volume flow measuring wheel.

10. The fan according to claim 1, wherein the rotational speed of the volume flow measuring wheel relative to a rotational speed of the impeller is determined from signals of the volume flow measuring wheel.

11. The fan according claim 1, wherein the rotational speed of the volume flow measuring wheel is determined from signals of the volume flow measuring wheel as the sum of a rotational speed of the impeller and a relative speed between the impeller and the volume flow measuring wheel.

12. The fan according to claim 1, wherein hardware components of the device for determining the air volume flow are assigned to the motor independently of the impeller.

13. The fan according to claim 1, wherein hardware components of the device for determining the air volume flow are assigned independently of the impeller to the structure arranged upstream of the impeller on the inflow side.

14. The fan according to claim 1, wherein signals and resulting measurement data of the volume flow measuring wheel are fed to a control of the fan for maintaining a predetermined or predeterminable volume flow under changing operating conditions.

* * * * *